Figure 1:
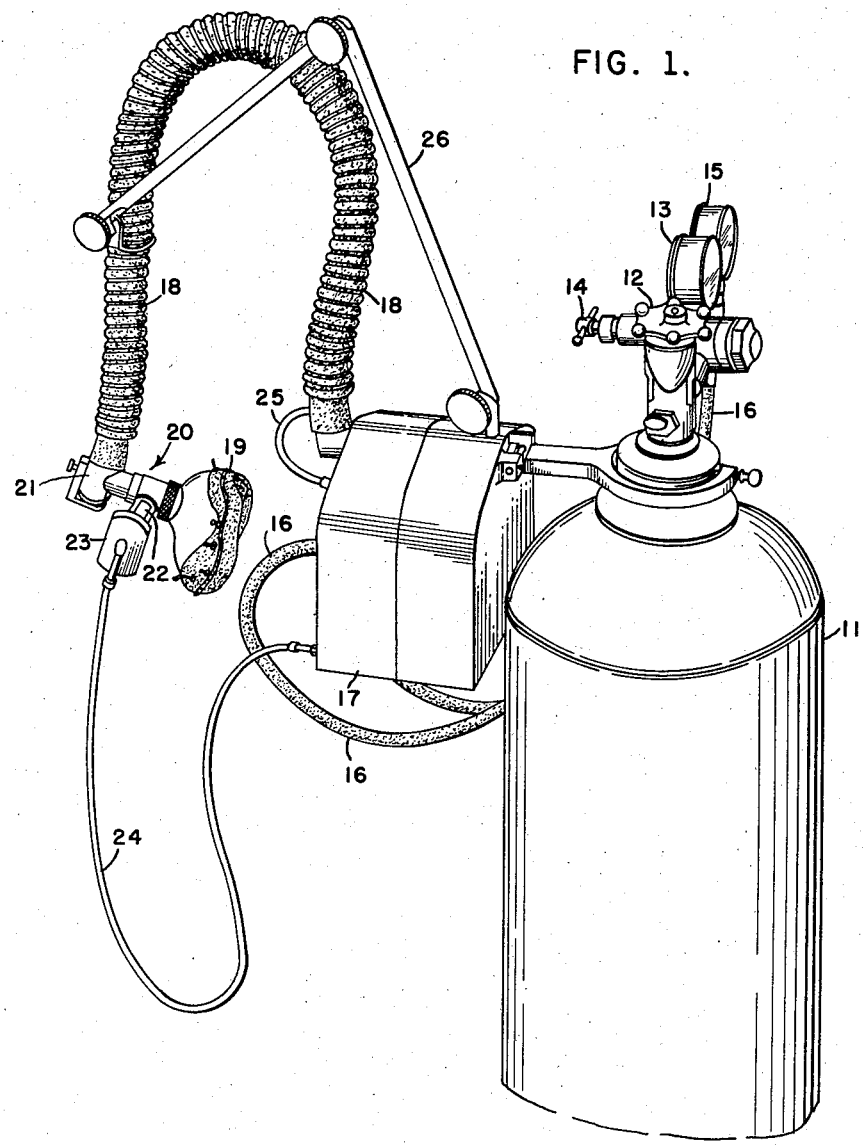

INVENTOR:
William H. Haverland

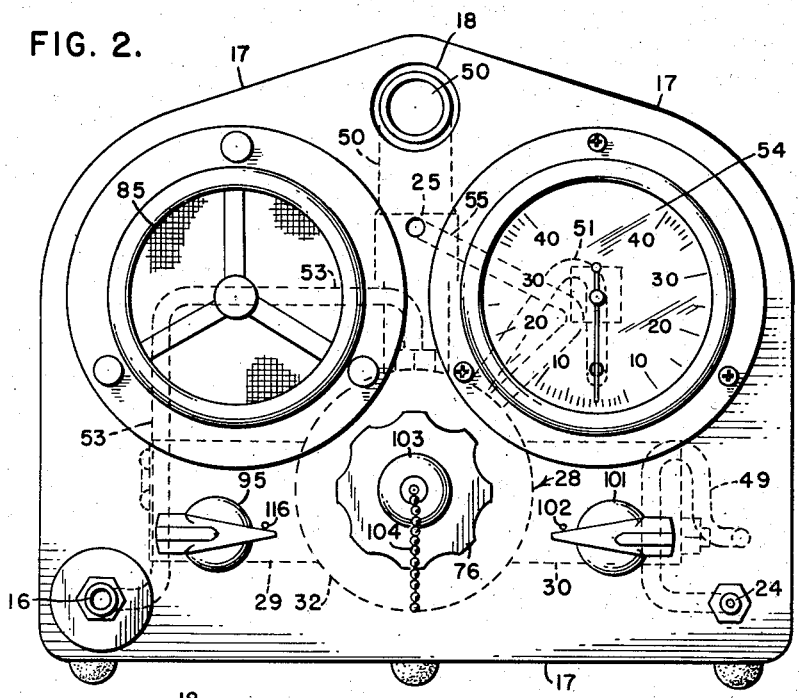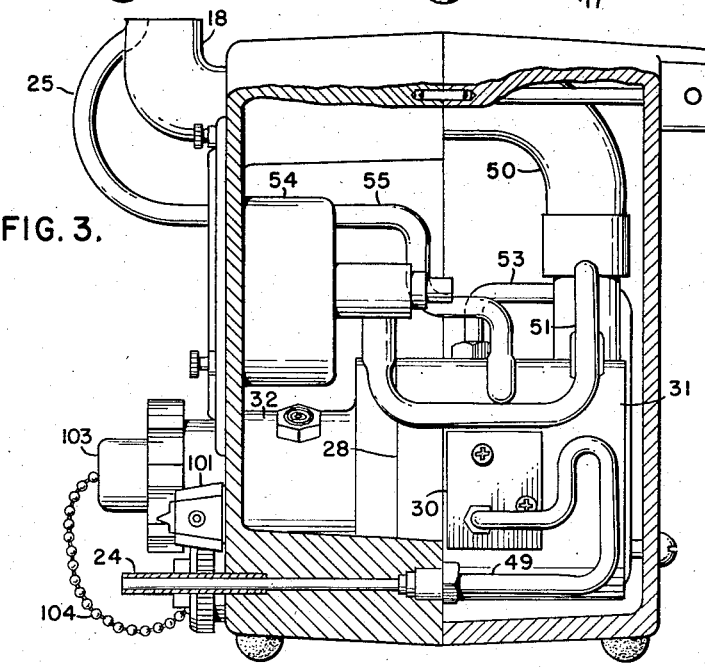

April 14, 1959

W. H. HAVERLAND 2,881,757

RESPIRATOR CONTROL SYSTEMS

Filed Jan. 3, 1956

7 Sheets-Sheet 3

INVENTOR:
William H. Haverland
BY
Arthur Middleton
ATTORNEY

April 14, 1959

W. H. HAVERLAND 2,881,757

RESPIRATOR CONTROL SYSTEMS

Filed Jan. 3, 1956

7 Sheets-Sheet 4

INVENTOR:
William H. Haverland
BY
Arthur Middleton
ATTORNEY

April 14, 1959 W. H. HAVERLAND 2,881,757
RESPIRATOR CONTROL SYSTEMS
Filed Jan. 3, 1956 7 Sheets-Sheet 5
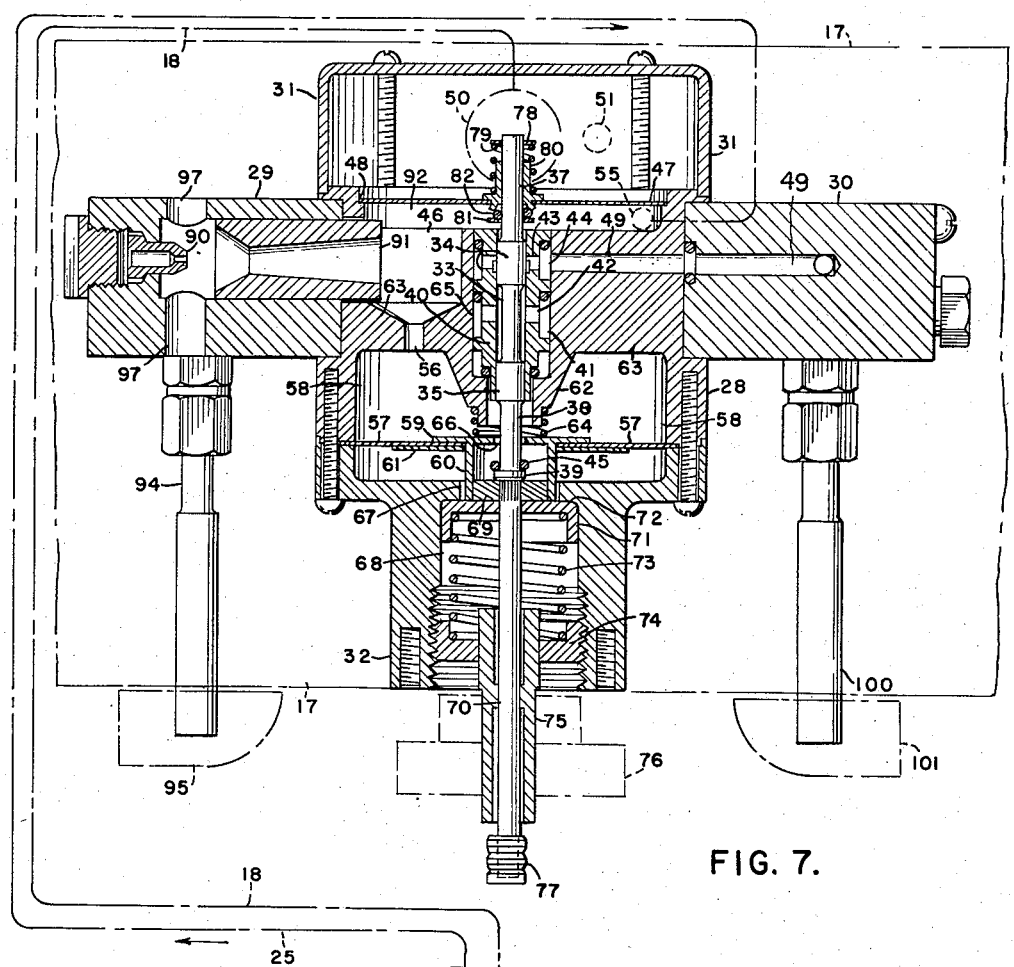
FIG. 7.
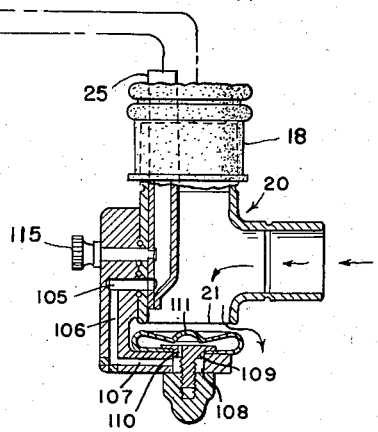
INVENTOR:
William H. Haverland
BY Arthur Middleton
ATTORNEY

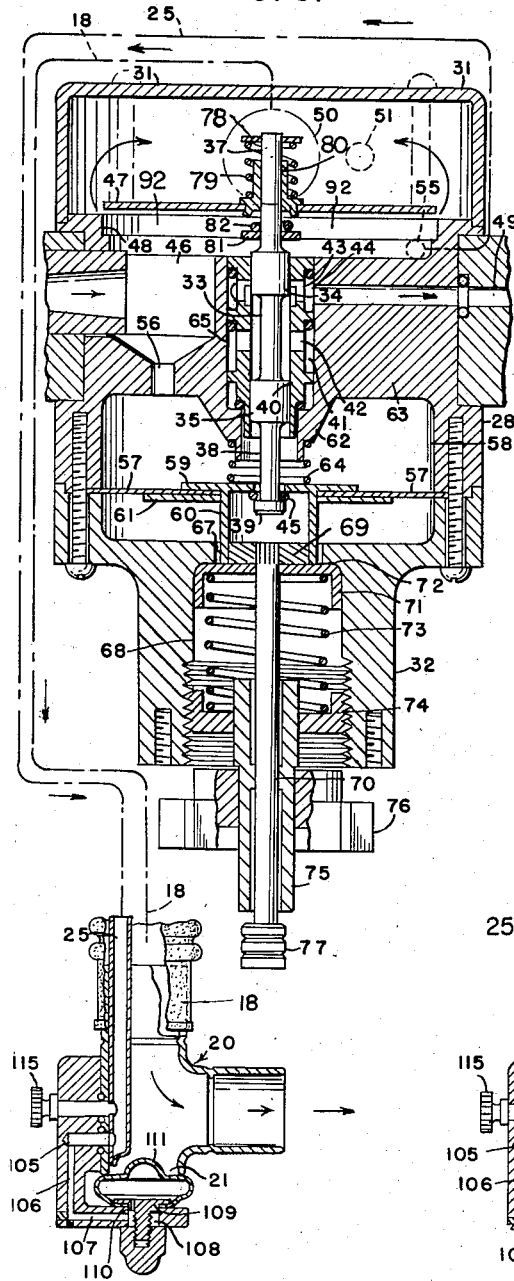
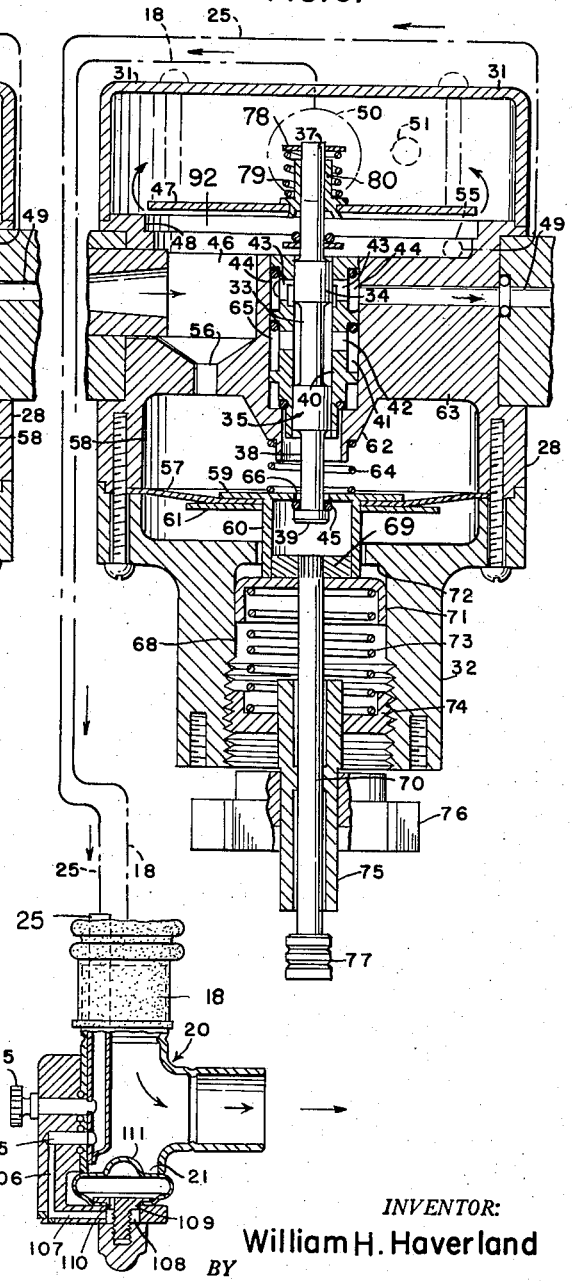

United States Patent Office 2,881,757
Patented Apr. 14, 1959

2,881,757
RESPIRATOR CONTROL SYSTEMS

William H. Haverland, Morrison, Colo., assignor to J. J. Monaghan Company, Inc., Denver, Colo., a corporation of Colorado Application January 3, 1956, Serial No. 557,065

19 Claims. (Cl. 128—29)

This invention relates to fluid flow regulating apparatus having many uses such as to deliver beneficial gas or gases to the lungs of humans or animals, or wherein it is desired to test cyclically or to exercise any pneumatically operated system between two given points. For instance, a device that may be used to enhance the breathing of a patient whose breathing for some reason is deficient in fulfilling normal requirements. A number of diseases or conditions occur in the human lung and respiratory system that impair the vital function thereof. Among such diseases and conditions are those described in medical literature as emphysema, bronchiectasis, asthma, pneumonoconiosis, pulmonary edema, silicosis problems, and other conditions referred to in the literature as Cor Pulmonale. Common to all these diseases can be dyspnea or difficult or laborious breathing. When breathing is normal, the in-breathing or inhalation or inspiration as it is usually referred to medically, inflates the lung cavities and thus constitutes half of the mechanical action of breathing, the other half being commonly referred to as exhalation and medically referred to as expiration. The lungs, by their own elastic recoil, collapse causing the out-breathing (exhalation or expiration) to take place.

So, in such a specific use, this invention is concerned with phase one, the inspiration breathing, which is a positive action involving the interplay of the musculature of respiration. Indeed, it is one object of this invention to devise an improved apparatus for the positive forcing of gases into the lung and thus assist the work of musculature, by causing beneficially a slight overdistention of the lung area above normal, and for forcing gas into certain portions of the alveoli not otherwise aerated. Another object of the invention is to devise a means whereby this action can be supplemented by giving it a therapeutic effect. Another object is to devise such an apparatus that functions at the instigation of the patient's own initiative, namely, a device that becomes operative as a result of pressure exerted on the device by the patient's inhalation. A further object is to make the device operate at a predetermined pressure during the patient's inhalation yet offers a minimum of resistance to the patient's exhalation. And yet another object is to so arrange the device that it can be used manually to resuscitate a person whose breathing has completely stopped. Complete cessation of breathing may be the result of such causes as drowning, electric shock, barbiturate poisoning, and the like. Under such conditions, a person is said to be apnenic. Still another object is to arrange such a resuscitating functioning under conditions whereby the operator can cycle manually an on-off valve controlling the pressured gas passing to the patient.

Yet, in the broadest sense, an object of this invention is to devise a spool-valve device that regulates a flow of fluid into a closed system in such a manner that the pressures of the system are cycled between predetermined values and whose operation is either manual or automatically follows the patient's breathing. Another broad object is to devise an apparatus wherein the rate of fluid flow reaches maximum value very soon after delivery commences; that is, as soon as the activating forces have overcome the inertia of the spool-valve. Flow is to cease with a corresponding sharpness, the rate of flow cut-off being determined by the area of a sensing disc and the tension of a spring-biased diaphragm. Another broad object is to devise means whereby the automatic cycling may be interrupted and the apparatus cycled manually at any time during any part of the cycle, and in addition the upper and the lower pressure limits of the cycle may be overridden by the manual control. And a still further broad object is to devise such an apparatus wherein the upper and the lower controlled limits are produced and varied by adjustment of a controlled force, namely, spring force exerted upon a pressure-controlling member and thus indirectly on the spool-valve at the moment of valve opening and by the positioning of the pressure-controlling member, with the upper and the lower control limits being determined by the design of the apparatus.

So, in the sense of one specific application, the invention may be said to comprise an intermittent positive-pressure breathing device or respirator that assists the patient to derive more benefit from his breathing function, either in the form of enhanced ventilation, increased oxygenation, the intake of vaporized or nebulized medicants, or some combination of any or all of these aids. When the patient has control of his breathing function, he will regulate and control the flow of gases or vapors by initiating flow by normal inhalation. The flow is stopped when that predetermined pressure selected by the attending physician is reached. When the patient is incapable of breathing or if for any reason the cycling of inhalation should be done for him, an attendant has full control with a manually-operated button.

More particularly for such a specific use, an embodiment of this invention comprises a supply of gas under pressure whose emission from the source is pre-set to be at a predetermined degree. A mask with a flexible tube extends from the patient's nose and mouth through a control cabinet to the source of pressured gas. An exhalation escape valve of a particular type is in the tube adjacent the mask that is provided with automatic means for opening it to pass exhalations of the patient to the atmosphere with a minimum of resistance thereto and for closing the valve upon initiation of the patient's inhalation. In the control cabinet and in circuit with the tube and the pressured gas is a pressure-sensitive diaphragm-operated spool-valve means for controlling the full admission of the pre-set pressured gas through the tube and mask to the patient by the pressure of the patient's inhalation until the patient's lung pressure equals the pre-set pressure of the gas and for controlling the termination thereupon of such admission. This control also assures that the pressure of the gas during inhalation remains substantially constant up to the instant of stoppage so there is a minimum of decay of the inflow. The control cabinet likewise has a control rod means forming in effect an extension of the pressure-controlling member and extending to the outside thereof whereby the patient or an attendant can, by reciprocating one section of the rod means, change the cycling of the respirator from being automatic to being manually operable, and by rotation of another section of the rod means change the pressures at which the device operates. And the control box also has means for admixing with the gas inflowing to the patient with nebulized medicine in any desired proportion, as well as for proportioning the mixing of gas such as oxygen, with air, should it be desired not to give the patient pure oxygen. Details of construction, arrangement, and connections will be described hereinafter, which with the foregoing offer many features of advantage.

However, for more general use, an embodiment of this invention comprises a supply of fluid under pressure whose emission from the source is pre-set to be at a predetermined degree. Between the source and the point of delivery of the fluid at a regulated pressure and at a regulated cycling, there is interposed a cabinet with such regulating apparatus. That apparatus includes a spool-valve reciprocable without substantial rotational movement by a fluid pressure-sensing disc whose area determines the rate of flow cut-off so that when flow ceases, it ceases with sharpness instead of permitting decay of the flow. The bodily laterally movable disc is spring biased to be responsive to relative pressure on its sides, so it is spring biased on one side directly and on the other side by a spring biased diaphragm whose lateral movement imparts itself to reciprocate the spool-valve axially. And these springs are adjustable relative to each other by the operator. The fluid pressure-sensing disc floats on the valve-spool and the spring pressure-sensitive diaphragm is also fully floating on the spool-valve. Action of the latter confines the limits of the axial reciprocation of the spool. This relationship provides a lag between the motion of the spool and the diaphragm so that essentially a spool-valve is linked between a fluid pressure-sensing disc and a spring pressure-sensitive diaphragm. The purpose of the pressure-sensing disc is to trigger the opening of the spool-valve and the spring pressure-sensitive diaphragm is to control the pressure at which closing of the pressure-sensing disc is effected. An extension of the spool-valve shaft projects from the cabinet where it is surrounded by a sleeve. Turning of the sleeve regulates the relative pressure of the spring on the diaphragm, while reciprocation of the shaft gives manual cycling instead of automatic cycling. It is to be noted that the fluid pressure-sensing disc controls the cycling operation of the apparatus between limits regulated by the regulatable setting of the spring pressure in one direction on the diaphragm with its proportional relationship to the non-regulatable spring pressure thereon in the opposite direction. It is also to be noted that the disc is fluid pressure sensing, while the diaphragm is spring pressure sensing.

Figure 4:
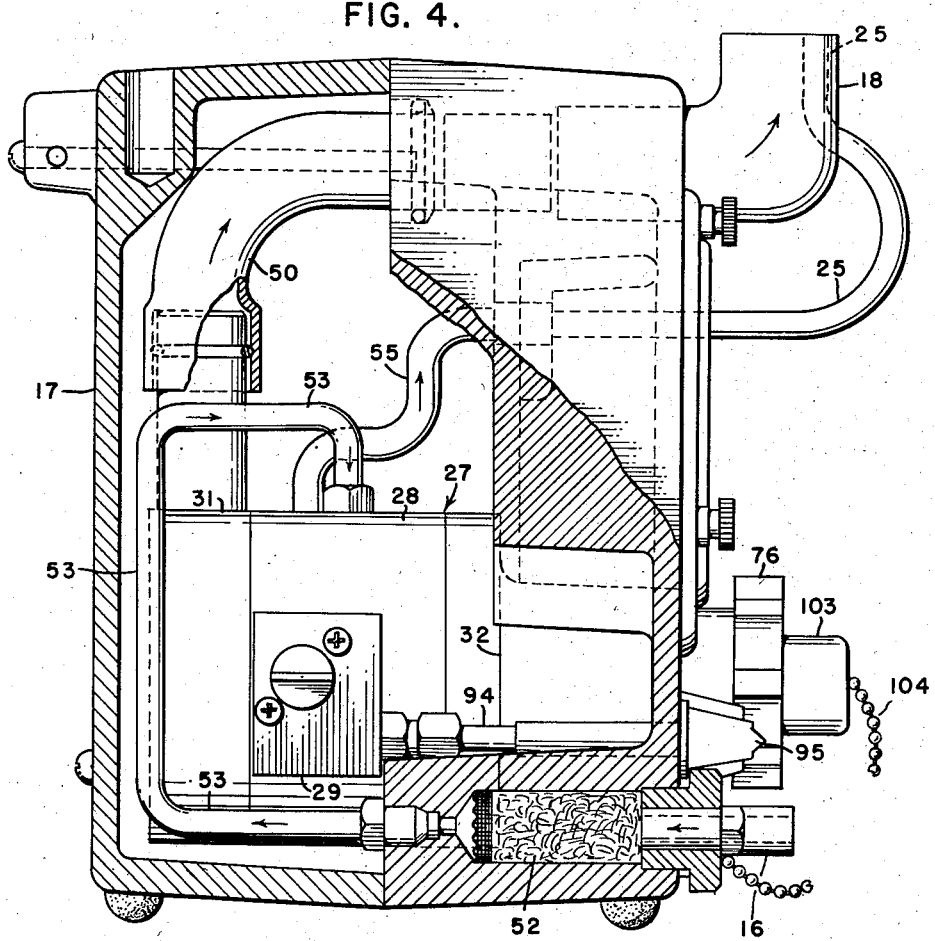
Figure 5:
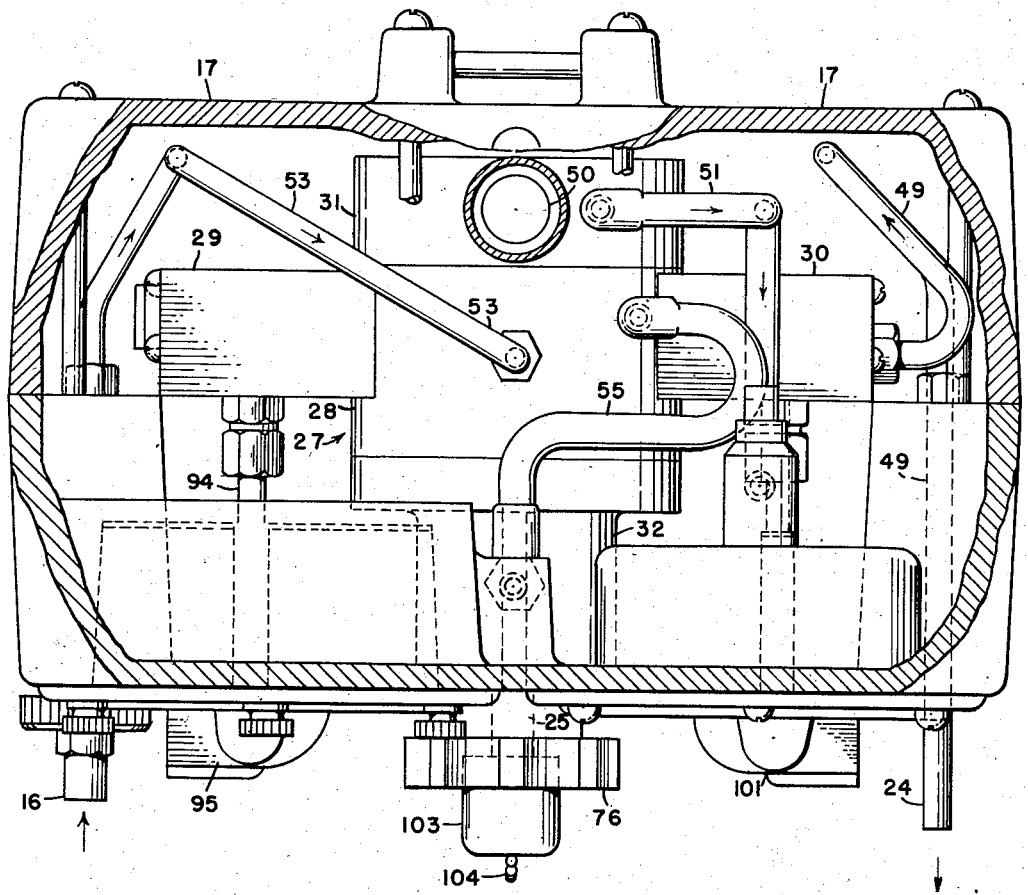
Figure 6:
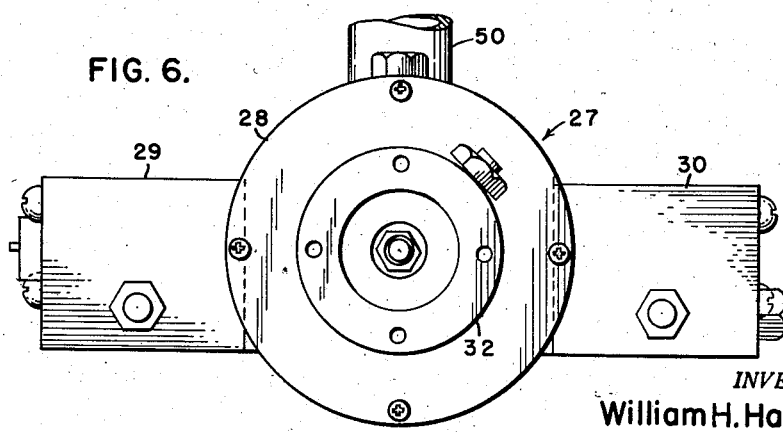
Figure 10:
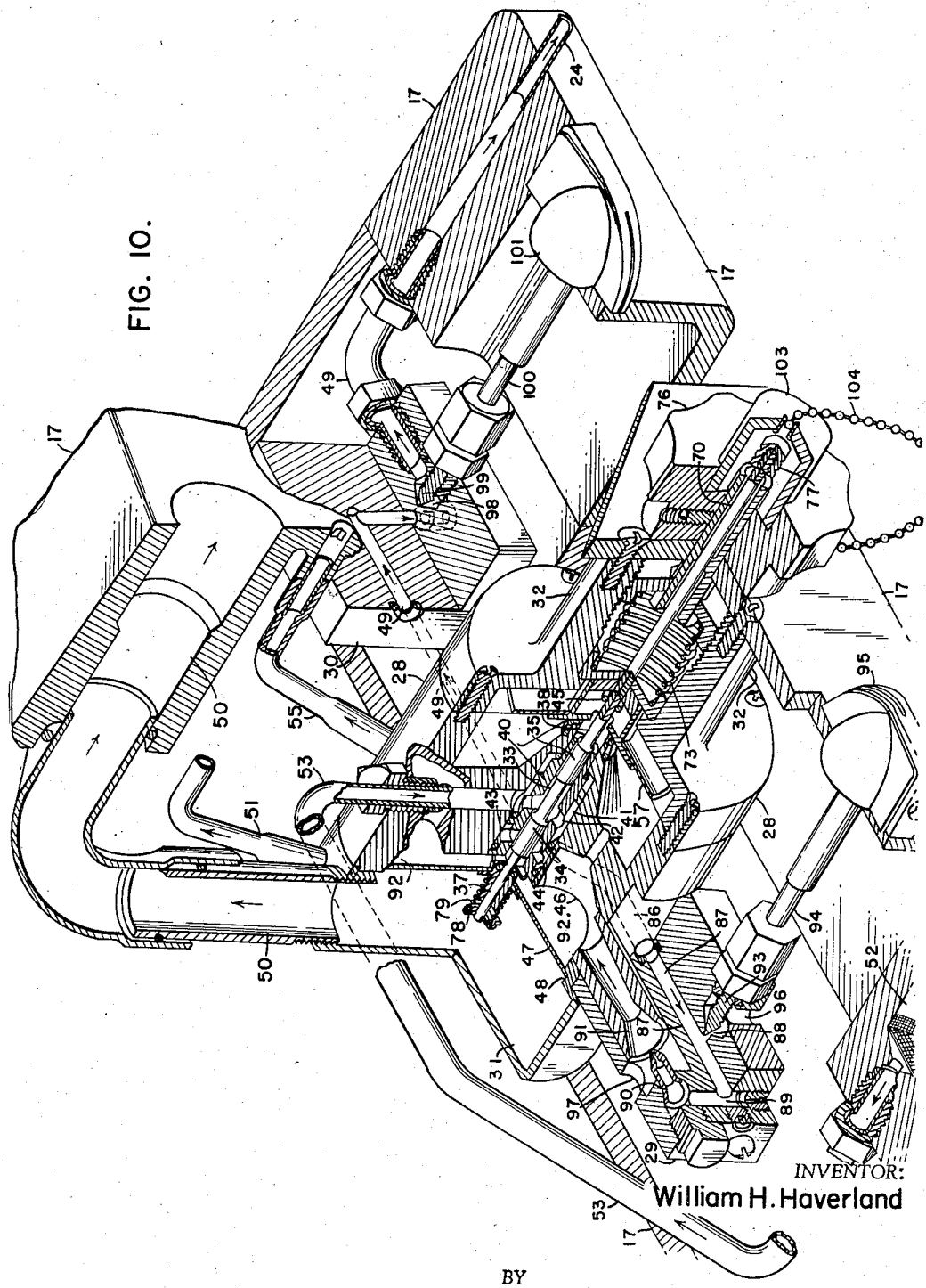

The invention is illustrated in the accompanying drawings in which Figure 1 is an isometric view of the source of pressured gas, in this example oxygen, the mask for the patient, and the control cabinet. Fig. 2 is a front elevational view of the control cabinet. Fig. 3 shows a view of the control cabinet of Fig. 2, with its right-hand end removed and looking toward the left. Fig. 4 shows a view similar to Fig. 3, except with the left-hand end of the cabinet removed and looking toward the right. Fig. 5 shows a top plan view of the cabinet with its top removed. Fig. 6 shows a front elevational view of the housing 28 with its laterally extending wing sections 29 and 30. Fig. 7 shows a horizontal sectional view of the housing 28 and the valve arrangements therein. Fig. 8 shows a view similar to that of Fig. 7, except with the laterally movable disc 47 and associated spool valve 34 in open position. Fig. 9 is similar to Fig. 8 except that the spool-valve means are in a somewhat different position. Fig. 10 shows an isometric view of the cabinet with parts broken away.

The complete embodiment of this invention as shown in the accompanying drawings comprises a respirator assembly for man or beast built around a particular valve arrangement that may perhaps have certain usefulness in other fields, so the valve arrangement will be described. But in order to describe informatively, it will be located in an environment as shown in Fig. 1, wherein 11 indicates a source of pressured fluid, in this case, a closed cylinder or cylinder containing oxygen. 12 indicates a valve on the outlet for controlling the emission of the gas as indicated by the gauge 13, while the valve 14 regulates the pressure of the emitted gas so the pressure thereof can be pre-set to a pressure shown on another gauge 15. Emitted gas at a pre-set pressure flows from the source 11 through a conduit 16 to a valve-assembly housing cabinet 17, and from thence through transversely corrugated delivery conduit or tube 18 going to the place of use, in this case a mask 19 for a patient's nose and mouth, with which mask is associated a T-shaped fitting 20 that includes an exhalation exhaust outlet 21, and a nebulized medicament inlet 22 from a source thereof 23. The medicament is in liquid form in the nebulizer 23, is atomized therein and forced through the inlet 22 into the fitting 20 from whence it is carried into the mask 19 as a result of pressure flowing through tube 24 leading from the cabinet 17. Another small tube 25 leads from the cabinet into and through the larger corrugated delivery tube 18. 26 indicates a bracket arrangement for holding the mask and its connections in an appropriate position with relation to the patient.

Centrally located horizontally in the cabinet 17 is a housing indicated generally at 27, seen best in Figs. 5 and 6, provided with a main body portion 28, having laterally extending wing-like boxes 29 and 30, a rear chamber 31, and a front boss-like projection 32. This housing is for encasing the valve-assembly that is such an important part of this invention. Located axially longitudinally within this housing is a floatingly reciprocable spool-valve shaft 33, as best seen in Fig. 7, carrying two spaced-apart spools 34 and 35 and an extension 37 of the shaft into the chamber 31, as well as an opposite extension 38 on the shaft terminating in a flanged end 39 carrying a ring bumper 45. This spool-carrying shaft 33 is reciprocable within a ported sleeve 40 having a peripheral groove 41 that receives gas from the source 11 at a pre-set pressure, and this passes to surround the valve shaft 33 through radial openings or inlet ports 42.

Pressure outlet ports 43 are provided radially of the shaft leading to a peripheral groove 44 in the sleeve, that, in turn, leads somewhat indirectly, but ultimately into the cylindrical chamber 46 at the left thereof and also leads through pipe 49 at the right thereof that is connected through tube 24 to the nebulizer 23 for receiving pressure outflowing through the pipe 49. That chamber 46 communicates with the end chamber 31, as can be seen in Fig. 10, if and when fluid-pressure sensing laterally movable disc 47 is moved to open the mouth 48 of the chamber 31. Rear chamber 31 has a larger outlet pipe 50 that is in communication with the corrugated tube 18 that leads to the patient, and that chamber also has a smaller outlet 51 that is in communication with the pressure-indicating gauge 54 on the cabinet. Pre-set pressure from source 11 flows from pipe 16 (Fig. 1) into the cabinet 17, in this case, through a filter 52 (Fig. 4) and thence through gas-entrance pipe 53 that leads to and delivers its pressure gas or fluid into the pressure-receiving peripheral grove 41 (Fig. 7) in the ported sleeve 40 that is around the spool-valve.

Outlet pipe 55 leads from space 92 beneath the disc 47 with which the chamber 46 communicates, namely, on the opposite side of the disc from chamber 31, from which the larger pipe 50 conveys pressured gas to the patient. (See Figs. 7, 8 and 9.) This is because the differential between pressures on opposite sides of the disc 47 is used to control opening and closing of the exhalation outlet 21 on the fitting on corrugated tube 18, should that be used. Outlet pipe 55 leads to the smaller tube 25 that is carried within the larger corrugated tube 18 leading to the patient.

While looking at Figs. 7 to 9, it can be seen that cylindrical chamber 46, beneath the disc 47, is funnel-shaped and through its neck outlet 56, communicates with diaphragm-bearing chamber 58 in the main body portion 28 of the housing 27, across which chamber is supported a spring-pressure sensing flexible diaphragm 57, carrying on its upper face, a plate 59 from which depends a socket member 60 tightly passing through the diaphragm and having secured thereto a diaphragm-stiffening disc 61, between which and the plate 59, the diaphragm is clamped. Between the plate 59 and an annular abutment 62 depending from a septum 63 in the main body 28 of the housing, is a coiled spring 64 adapted to bias the diaphragm away from the abutment. The septum 63 includes the chamber 46 and its neck-like outlet 56, as well as the pressure outlet pipe 49; and the central bore 65 in which the spool-valve assembly is located. Returning to the diaphragm 57, it is apertured at 66 to enable the spool-valve shaft 38 to pass floatingly therethrough, and similarly, the socket member 60 depending from the diaphragm floatingly passes through an opening 67 in the bottom of the front boss-like section 32 of the housing 27 that has a cup-shaped recess 68 therein. The socket member 60 has its mouth closed by a plug 69 from which fixedly depends a manually-operable shaft 70 that is shown as being aligned with the spool-valve shaft 33. Also carried by the plug 69 is a reciprocable cup 71 adapted to seat inwardly or upwardly against a seat 72 and to be biased toward its seat by coiled spring 73, that presses upwardly from a screw-threaded cup 74 that is rotatable axially by means of a sleeve 75 that it carries and on which, exteriorly of the cabinet 17, is an adjusting turning knob 76. 77 indicates a push-and-pull handle by which the shaft 70 can be reciprocated longitudinally for the manual operation of the valve assembly. At the other end of the spool-valve shaft 33, and particularly its upper extension 37, the end of the extension has a washer 78 against which a coiled spring 79 bears to cause to be biased the sleeve 80 to which the laterally movable disc 47 is secured. Beneath the disc there is secured to the shaft extension 37 another washer 81, on which is a ring bumper 82; for serving to limit resiliently the downward movement of the disc 47 when it reaches its seat 48, whereby spool 34 continues to be positioned so as to allow no further passage of gas through radial openings 42 and 43 to peripheral groove 44 or to chamber 46 or to pipe 49.

Now let us come to the elements provided in the control cabinet for use when the apparatus is to be applied to a patient for benefiting his respiratory processes. First it must be recalled that there is air in the interior of the cabinet which has entered it through the air-filter 85 in the face of the cabinet 17 (Fig. 2), so it is available for use in controlling the mixing under controlled conditions of air with the incoming pressured gas or oxygen.

But perhaps we should first describe how the oxygen gets to the spool-valve assembly, looking at Fig. 10. Pressured oxygen or other gas, comes through pipe 53 to the spool-valve, and if the valve permits, then flows from the peripheral groove 44 (if the spool valve 34 permits) through pipe 86, and duct 87, past valve-seat 88, and up extension 89 of duct 87, to be emitted through jet nozzle 90, whereupon it passes through venturi 91 to enter chamber 46 that opens into the space 92 beneath the disc 47, to press upwardly against that disc. If air from the interior of the cabinet 17 is to be admixed with the oxygen, needle valve 93 is closed on its seat 88 by means of rod 94 that is operated by air-mix adjusting handle 95, which when in extreme position engages stop 116 (see Fig. 2). So when valve 93 is closed air is sucked in through openings 97 in the lateral box 29, through influence of the jet nozzle 90. Air and oxygen are thoroughly mixed in the venturi 91.

If oxygen only is desired to be supplied to the patient, we open the valve 93 from its seat, allowing some oxygen to bleed off through bleed port 96 from the main stream of oxygen in the duct 87, filling the interior of the control cabinet which intentionally has an air-tight case except for the filtered air inlet 85. As the oxygen continues to be bled off into the interior of the casing, in volume in excess of gas sucked in through the always-open inlet port 97 by the venturi 91, pressure within the sealed control cabinet builds up atmospheric and retards inflow of air through the air filter 85 whereupon the patient receives oxygen only. By regulating the degree of opening the needle valve 93 from its seat 88, any percentage of air-oxygen mixture can be achieved.

Now suppose it is desired to admix also some nebulized medicament with the gas going to the patient. The latter is forced from the nebulizer or atomizer 23 (Fig. 1) by pressure flowing through tube 24 from conduit 49 past a valve-seat 98 controlled by needle valve 99, on rod 100, operated by a handle 101 exteriorly of the cabinet, that also has a stop 102 (Fig. 1) to limit its extreme position. Pressure gets into pipe 49 if valve 99 is open, from a continuation thereof that leads from peripheral groove 44 around spool 34, where it receives pressured gas incoming thereto through pipe 53 that is connected to tube 16 and the source of gas 11. It will be noted that the supplying of the nebulized medicament to the patient terminates automatically with termination of the inhalation cycle and also that the medicament is received by the patient at the initiation of each inhalation—so long as the medicament needle valve 99 is open. 103 indicates a plastic cover, preferably in red, over the push and pull handle on the shaft 70, to protect it from inadvertent manual operation. The cap is held against loss by chain 104.

And finally let us go to describe the details of the exhalation outlet 21 (Fig. 1, but more particularly Figs. 7 to 9). Pressure from the space 92 beneath the fluid-pressure sensing disc 47 flows through small tube 25 that actually is housed within the corrugated tube 18, which latter terminates in fitting 20, so that there is delivered to the fitting (leading to the mask 19) pressure from the chamber 31 above the disc 47. Thus we have within the corrugated tube 18 and the fitting 20, pressure from above the disc while in the small tube 25 we have pressure from beneath the disc which is at atmospheric pressure through inlet opening 97 from the interior of the control cabinet. This allows the balloon valve 111 to be deflated as the result of its air passing therefrom upwardly through ducts 107, 106, 105 and 25 to outlet 55 beneath disc 47. The tube 25 is connected duct sections 105, 106 and 107 to a space 108, closed by a plug 109 having a bleed-off passage 110 that opens into a deformable or collapsible balloon-like valve member 111, which when expanded closes exhalation outlet 21, but which when deflated opens it, as can be seen in Fig. 7, as open, and in Figs. 8 and 9 as closed. That is, when the pressure in the corrugated tube 18 from one side of disc 47 is greater such as when the patient is exhaling, then the ballooning diaphragm valve 111 will open, whereas when the pressure in the smaller tube 25 from the other side of the disc 47 is greater as when the patient is inhaling, the valve will remain closed. 115 indicates a thumb screw for disassembly purposes, that is for the removal of the diaphragm valve and its associated parts from the T fitting 20.

In operation, the apparatus is assembled as shown in Fig. 1 and the mask is applied to the patient's nose and mouth. The pressured oxygen in the tank 11 is arranged by the valves 12 and 14 to be emitted at a pre-set pressure ranging, as the technician may determine, in a range of from 35 to 55 pounds per square inch. This flows through tube 16 to control cabinet 17 where it enters through filter 52 into pipe 53 (Fig. 4) and passes to peripheral groove 41 in ported sleeve 40 around the spool-valve shaft 33 (Fig. 7) where it stops, since in that position spools 34 and 35 confine it there. Now let us suppose that the patient begins his inhalation or inspiration cycle. His inhalation into the mask 19 establishes a sub-pressure in corrugated tube 18 that extends through pipe 50 into the rear chamber 31 (Fig. 7) whereupon the fluid-pressure sensing laterally movable disc 47 moves off its seat 48 to open it (Fig. 8). Opening movement of disc 47 moves with it the spool shaft extension 37 against the closing pressure of spring 79, which, in turn, moves the spool 34 from closing position with respect to outlet port 43 and peripheral groove 44 (Fig. 7), to opening position with respect to that groove as shown in Fig. 8. This allows the pressured oxygen in peripheral groove 41 to flow outwardly from now open outlet port 43 and peripheral groove 44 through pipe 86 (Fig. 10) into duct 87, up extension 89, through nozzle or jet 90 into venturi 91, to enter cylindrical chamber 46 and spread to space 92 in front of or beneath disc 47. The pressured oxygen then flows around the disc 47 entering rear chamber 31 and thence through outlet pipe 50 through corrugated tube 18 to the mask 19 on the patient. This continues throughout the inhalation phase of the breathing cycle.

Thus Fig. 7 shows the valve mechanism or system completely closed and inactive during the patient's exhalation or expiration phase of the breathing cycle since the patient's exhalation passes from the mask to the fitting 20 and out therefrom past unseated and deflated balloon valve 111. Fig. 8 illustrates the position of the valve system during the inhalation phase, as described above, wherein the system is in operation with little or no back pressure.

Now let us look at Fig. 9 that shows the system still delivering gas to the patient but the back pressure is building up almost to the cut-off point. A flow of gas is still passing from the tank 11 through tube 16 into the cabinet 17 and thence through pipe 53 into peripheral groove 41 in ported sleeve 40 and radial outlet port opening 42 to encounter spool-valve shaft 33 past which it flows through radial outlet port opening 43 and thence through pipe 86 (Fig. 10) ducts 87 and 89, nozzle 90, and venturi 91 into space 92 beneath or in front of the disc 47. As the patient's rate of inhalation lessens, pressure increases in the system. As spring 79 is so functioning to begin to close disc 47, there is a relatively greater pressure exerted under the disc by the pressured oxygen in space 92 than the lesser pressure exerted on top of the disc 47 by the patient's reduced inhalation. Whereupon, due to this differential pressure, the pressure of the oxygen in the space 92 extends through cylindrical chamber 46 and its neck outlet 56 to enter the diaphragm chamber 58 and depress the diaphragm 57 as shown in Fig. 9. Progressive depression of the diaphragm 57 causes diaphragm plate 59 to engage flanged end 39 of the extension 38 of valve shaft 33 through 45 and move the valve shaft together with its valve spools 35 and 34 downwardly until spool 34 covers and closes radial opening 43 (leading to peripheral groove 44), thus shutting off all pressured oxygen at that point—the parts therefore taking the positions shown in Fig. 7 where all that is taking place is the exhalations of the patient passing from the mask through fitting 20 past open balloon valve 111 to the atmosphere.

The operation of the apparatus of Figs. 7, 8 and 9 is so important that it will be described again in other words. The present method of coupling the sensing disc 47, shaft 37 with spools 34 and 35 and the pressure sensing diaphragm 57 permits complete opening of the port 43 to the pressure source 42 and allows free flow of gas through the system. This can be seen by examining Fig. 7 in which sensing disc 47 and port 43 are closed and the pressure control spring 73 is compressed against slidable cup 71 which through socket 60 holds diaphragm 57 in its static position. Now support control knob 76 is adjusted, turning shaft 75 and screw 74 to compress spring 73 and exerting a force equal to the force which the desired pressure of gas will exert on the other side of the diaphragm. The spring then is in contact with diaphragm socket 60 through slidable cup 71 but is exerting its force against seat 72 which restrains it.

As the sensing disc 47 and port 43 are opened (Fig. 8) shaft 37 with its spools 34 and 35 is restrained in the full open position through contact of flange 39 and ring 45 with plate 59. Since the passage 50, tube 18 and manifold 20 are sufficiently open to permit free flow of all the gas delivered through venturi 87 the pressure within chamber 58 does not increase and act upon diaphragm 57. If a restriction is placed at the outlet of manifold 20 such that a greater pressure is required to force the gas through it at the same rate then the pressure will increase in chamber 58 and act on diaphragm 57 and through diaphragm extension 69 press against spring 73 through sliding cup 72, however, since spring 73 is compressed and restrained by seat 72, pressure may act upon diaphragm 57 and exert a force on spring 73 without deflecting it, so long as the force is not greater than that exerted by the spring. Therefore, it is possible for shaft 37 with spools 34 and 35 to remain in the position shown in Fig. 8 with port 43 fully open and the full volume of gas admitted through port 43 and nozzle 90 plus the volume admixed through ports 97 and directed through venturi 91 to be forced at the same rate of flow through progressively greater restriction until the pressure required to overcome the restriction creates a force on diaphragm 57 great enough to deflect spring 73. When this occurs its movement will withdraw shaft 37 and spools 34 and 35 from the position shown in Fig. 9 finally shutting off the flow of gas through port 43 completely.

The balloon valve 111 in Figs. 8 and 9 is closed because pressured oxygen from space 92 beneath the disc 47 passes through tube 25 into the fitting 20 and thence through ducts 105, 106, 107 and 110. The balloon valve 111 is thus pressed shut because the pressure in tube 25 and ducts 105, 106, 107 and 110 is greater than the pressure in tube 18 that leads from the pipe 50 that carries the patient's inhalation pressure to the rear chamber 31. By this arrangement the balloon valve is closed or seated during the inhalation phase of the patient's breathing but opens or unseats quickly when the inhalation phase changes to the exhalation phase.

Diaphragm 57 is spring-biased downwardly in Figs. 7 to 9 by coil spring 64, whereas that diaphragm is spring-biased upwardly by coil spring 73 through its slidable cup 71 and socket member 60. There is an adjustment of spring 73 by rotation of turning knob 76 so that the patient will get, during his inhalation phase, the correct degree of pressure on his oxygen, as indicated on the gauge 54 on the face of the cabinet 17 (Fig. 2).

During inspiration, delivery of gas is required on demand at a variable rate of flow (from 125 liters per minute to 0) and at a controlled low pressure (0–35 cm. $H_2O$). In order to provide the necessary volume of gas at these low delivery pressures, large bore tubing and connectors are necessary throughout the low pressure side of the system, consequently, the velocity of the gases through this part of the system is not great enough to actuate a venturi. In order to provide the high velocity to drive the venturi, higher pressured gas is directed through a restricted orifice in the nozzle 90 into venturi 91 creating the pressure differential which causes air to flow inward through the ports 97 and mix with the pressured gas. Inasmuch as the pressured gas used in pure oxygen and the delivered gas required by the patient is sometimes desired to contain only 35% oxygen, it can be seen that almost six volumes of air (containing about 21% oxygen) must be added to each volume of oxygen. Thus, since the maximum delivery flow rate required is 125 liters per minute, only about 18 liters per minute of pressured gas are required to mix with air. It is, therefore, possible to use a small nozzle, at the pressures available, to achieve a high velocity to drive the venturi efficiently and at a low noise level.

To some patients it is necessary to administer 100% pure oxygen under the same conditions of flow and pressure and it is here that this invention presents one of its unique features. In the method described for admixing air with oxygen using the venturi principle, it should be noted that as the pressured gas flows through the nozzle 90 into the venturi 91 creating subatmospheric pressure in the chamber between them, air is caused to flow through the ports 97. By placing the entire valve assembly within a housing cabinet 17 the pressure within the housing cabinet 17 becomes subatmospheric. Thus by sealing all of the cabinet 17 with the exception of an opening in front of the cabinet in which is installed a filter 85, all of the air mixing with the oxygen passes through this filter. Now when it is desired to provide oxygen alone for the patient, the needle valve 93, Figure 10, is withdrawn from its seat 88 by rotating knob 95 thence shaft 94. This allows pressured gas from duct 87 to escape through port 96. Valve seat 88 is open to duct 87 which also supplies pressured gas to nozzle 90 and is designed with sufficient opening that when needle valve 93 is withdrawn by the complete rotation of knob 95 and shaft 94, approximately six times as much oxygen bleeds through the seat 88 and port 96 as flows through nozzle 90.

It should be recalled that the venturi is so arranged that when admixing air its capacity at the nozzle velocity available is sufficient to suck in six volumes of air through ports 97 for each volume of pressured oxygen flowing through nozzle 90, therefore, when this volume of oxygen is bled through seat 88 and port 96 into the housing cabinet 17, the housing cabinet 17 is then filled with pure oxygen and the pressure becomes atmospheric, therefore, air cannot flow into the cabinet through filter 85, but since the chamber to which ports 97 are open is subatmospheric, due to the action of the nozzle 90 and venturi 91, then pure oxygen within cabinet 17 supplied through 96, is drawn into ports 97 and mixed with the pressured oxygen from the nozzle 90 thence to the patient.

Some patients require oxygen enrichment in varying degrees between 35% and 100% and it can be seen that with the method herein described, the pressure within the cabinet 17 can be infinitely varied, within the range provided, by the degree of opening between the needle valve 93 and its seat 88, hence the flow of air through filter 85 is controlled by the difference in pressure within and outside the cabinet.

Now let us discuss adding a medicament to the mixture to be inhaled by the patient. Recall that tube 24 is connected to a nebulizer or atomizer 23 (Fig. 1) connected to the fitting 20 on the mask 19. The tube 24, in Fig. 10, is shown to be connected to pipe 49 having a valve seat 98 controlled by needle valve 99 on shaft 100 operated by handle 101. Pipe 49 continues to connect with peripheral groove 44 in valve sleeve 40 (Fig. 8) whereby pressured oxygen around the spool-valve shaft 33 forces outward pressure through pipe 49 and tube 24 sufficient to operate the nebulizer 23 to atomize any medicament therein which is thus delivered to the mask on the patient. Whether or not the medicament is thus delivered is controlled by the handle 101 whose rotation closes the needle valve 98 or opens it as desired, to motivate the nebulizer.

It has been stated that the cycling operation of this respirator valve assembly or system is automatic in operation, operated solely by the patient's inhalation and exhalation.

However, patients who require such therapy when victims of severe respiratory infections often get into serious difficulty because of their already deficient respiration and become apneic for considerable periods of time. During these periods the patient must be made to breathe either by an automatic device or by manual operation of a device such as that herein described. Sometimes these patients breathe spasmodically for several minutes and then cease breathing entirely for some time. During these periods of breathing it is extremely difficult to synchronize a rhythmic cycling automatic device or to follow manually the erratic breathing pattern. Therefore, provision for manual operation of this device is made without interfering with the patient control feature as can be seen from the following description.

In normal patient controlled operation of this device as previously described as the patient begins his inhalation or inspiration cycle, his inhalation from the mask 19 establishes a subpressure in corrugated tube 18 that extends through pipe 50 into the rear chamber 31 (Fig. 7) whereupon the fluid-pressure sensing laterally movable disc 47 moves off its seat 48 to open it (Fig. 8). Opening movement of disc 47 moves with it the spool shaft extension 37 against the closing pressure of spring 79, which, in turn, moves the spool 34 from closing position with respect to outlet port 43 and peripheral groove 44 (Fig. 7), to opening position with respect to that groove as shown in Fig. 8. This allows the pressured oxygen in peripheral groove 41 to flow outwardly from now open outlet port 43 and peripheral groove 44 through pipe 86 (Fig. 10) into duct 87, up extension 89, through nozzle or jet 90 into venturi 91, to enter cylindrical chamber 46 and spread to space 92 in front of or beneath disc 47. The pressured oxygen then flows around the disc 47 entering rear chamber 31 and thence through outlet pipe 50 through corrugated tube 18 to the mask 19 on the patient. This continues throughout the inhalation phase of the breathing cycle.

To manually trigger or supply this starting impulse to the device, the operator after removing the cap 103 must lightly press the manual control button 77 depressing diaphragm 57 and plate 59 against flanged end 39 of the extension 38 of valve shaft 33 moving shaft and spools 34 and 35, opening radial groove 43 thereby connecting with radial groove 42 and the source of pressured gas from pipe 53 (Fig. 10). This then permits the pressured gas to flow through radial outlet port opening 43, pipe 86 (Fig. 10), ducts 87, 89, nozzle 90 and venturi 91 into space 92 beneath disc 47 thereby creating greater pressure on the underside of disc 47 causing it to raise from its seat permitting gas to flow through chamber 31, tube 18 to the patient and at the same time through movement of the sensing disc deflecting spring 79 between disc 47 and retaining ring 78 exerting a force which moves shaft 37 with spools 34 and 35 along its longitudinal axis further opening ports 43 and stopping only when it is restrained by the pressure sensing diaphragm 57 through ring 66 against flanged extension 39 of shaft 37. As the patient's lungs are inflated, pressure in the mask 19, tube 18 and chamber 31 increases and as the pressures above and beneath sensing disc 47 begin to equalize the gap between the disc and seat 48 diminishes. Meanwhile, pressure in chamber 58 opens through port 56 is also increasing and acting upon diaphragm 57 and as the force created by the pressure becomes greater than that exerted by pressure control spring 73 the spring is deflected and the flange extension 39 of shaft 37 is engaged through ring 66 by the pressure sensing diaphragm moving shaft 37 and spools 34 and 35 to the position shown in Fig. 7, closing ports 43 and shutting off the flow of pressured gas.

Thus it can be seen that manual triggering of the valve through manipulation of the manual control button 77 initiates essentially the same chain of events as does the slight lowering of pressure on the back side of sensing disc 47 when the patient begins to inhale. Since in either case the completion of the inspiratory phase of the cycle and closing of the valve is automatic once the triggering impulse is supplied one method will in no way interfere with the other and the device can be operated intermittently by either means. For example, suppose a patient has stopped breathing and the technician is performing artificial respiration by rythmically touching the manual control button. After several minutes the patient may take a deep gasping breath followed by fairly rapid breathing for several minutes during which time the technician refrains from any manipulation of the valve. When the patient again stops breathing the technician resumes the steady rhythmic manual cycling. Still another example is a patient who, because of severe shock, drowning or inhalation of toxic gas, has stopped breathing and is being administered artificial respiration with this device. After a long period of time a very feeble effort to breathe is made by the patient. The effort is far too weak to sustain life but if it is sufficient to act on the very sensitive sensing disc of the valve, triggering occurs and pressured gas is delivered to the patient expanding the lungs and completing the cycle heretofore described, thus this assistance to the patient's own feeble efforts may be rendered for several hours until recovery is complete.

So in operation this device, after being triggered by the natural start of inhalation by the patient, supplies a flow of gas to the face mask at a given initial rate and then tapers off as the adjusted control pressure is approached. This flow is reduced to zero when the adjusted control pressure is reached whereupon the patient can exhale by natural processes. The device then remains static until the patient again inhales. The device, it will be seen, allows exhalation at any time pressure in the face mask reaches the control pressure, so the device can be completely patient controlled.

As this invention may be embodied in several forms without departing from the spirit or essential characteristics thereof, the present embodiment is therefore illustrative and not restrictive, since the scope of the invention is defined by the appended claims rather than by the description that precedes them, and all changes that fall within the metes and bounds of the claims or that form their functional as well as conjointly cooperative equivalents, are therefore intended to be embraced by those claims.

What is claimed is:

1. Respirator apparatus for enhancing a patient's breathing when such breathing is for some reason deficient to meet normal requirements by supplementing gas flowing to the patient's lungs from a supply of pressured gas while the degree of supplementation is controlled by the pressure exerted by the patient's inhalation meanwhile minimizing resistance to passage of the patient's exhalations to the atmosphere, which comprises a source of gas whose pressure when emitted is pre-set, a face mask for the patient, a control cabinet, gas conducting means from the supply of gas to the control cabinet, a flexible tube for conducting gas from the control cabinet to the mask, an exhalation escape valve in the tube adjacent the mask, automatic means for opening the escape valve to pass exhalations of the patient to the atmosphere and closing it upon the patient's inhalation, pressure-responsive spool-valve means on the control cabinet for controlling the admission of pre-set pressured gas past the spool-valve means to flow through the flexible tube to its connected mask by pressure exerted on the valve means by the patient's inhalation until the patient's lung pressure substantially equals the pre-set pressure of the gas and the termination thereupon of such admission, a supply of nebulized medicament connected with the mask, a connection thereto with the cabinet, and means in the cabinet for controlling the admixing of pressured gas from a gas supply with the supply of medicament.

2. Respirator apparatus for enhancing a patient's breathing when such breathing is for some reason deficient to meet normal requirements by supplementing gas flowing to the patient's lungs from a supply of pressured gas while the degree of supplementation is controlled by the pressure exerted by the patient's inhalation meanwhile minimizing resistance to passage of the patient's exhalations to the atmosphere, which comprises a source of gas whose pressure when emitted is pre-set, a face mask for the patient, a control cabinet, gas-conducting means from the supply of gas to the control cabinet, a flexible tube for conducting gas from the control cabinet to the mask, an exhalation escape valve in the tube adjacent the mask, automatic means for opening the escape valve to pass exhalations of the patient to the atmosphere and closing it upon the patient's inhalation, pressure-responsive spool-valve means on the control cabinet for controlling the admission of pre-set pressured gas past the spool-valve means to flow through the flexible tube to its connected mask by pressure exerted on the valve means by the patient's inhalation until the patient's lung pressure substantially equals the pre-set pressure of the gas and the termination thereupon of such admission, an air-inlet port in the control cabinet, a supply of nebulized medicament connected with the mask, and means in the cabinet for controlling the admixing with gas going from a gas supply to a patient of air from the air-inlet port and of medicament from the medicament supply.

3. Respirator apparatus for enhancing a patient's breathing when such breathing is for some reason deficient to meet normal requirements by supplementing gas flowing to the patient's lungs from a supply of pressured gas while the degree of supplementation is controlled by the pressure exerted by the patient's inhalation meanwhile minimizing resistance to passage of the patient's exhalations to the atmosphere, which comprises a source of gas whose pressure when emitted is pre-set, a face mask for the patient, a control cabinet, gas-conducting means from the supply of gas to the control cabinet, a flexible tube for conducting gas from the control cabinet to the mask, an exhalation escape valve in the tube adjacent the mask, automatic means for opening the escape valve to pass exhalations of the patient to the atmosphere and closing it upon the patient's inhalation, pressure-responsive spool-valve means on the control cabinet for controlling the admission of pre-set pressured gas past the spool-valve means to flow through the flexible tube to its connected mask by pressure exerted on the valve means by the patient's inhalation until the patient's lung pressure substantially equals the pre-set pressure of the gas and the termination thereupon of such admission, manually operable means for cycling the alternating change from inhalation to exhalation and back to inhalation in the event the patient is apneic, wherein the pressure-responsive spool-valve means includes a chamber across which a diaphragm is mounted, a reciprocable spool-valve movable by the lateral flexing of the diaphragm, a ported casing around the spool-valve having a pressure gas inlet port and a pressured gas outlet port the latter of which is connectible and disconnectible with the inlet port by the spool-valve, a laterally-movable disc controlling passage of pressured gas from the outlet port to the tube leading to the mask, a pressure-receiving chamber openable and closable at one end by the diaphragm, means for conducting pressured gas from the outlet port in the spool-valve into the pressure-receiving chamber through a venturi, air-inducting jet means between the last named conducting means and the venturi, and air-admixture control means extending outside the control cabinet for controlling the rate of pressured gas passing through the jet means into the venturi for thus regulating the degree of admixture of air with the pressured gas.

4. Apparatus according to claim 3, with the addition that the spring tension varying shaft is hollow while the spool-valve rod means passes through the lateral extension on the diaphragm whereby rotation of the hollow shaft adjusts tensions of the spring tensioned against the diaphragm to control the pressure while reciprocation of the spool-valve rod effects manual cycling operation of the respirator.

5. Respirator apparatus for enhancing a patient's breathing when such breathing is for some reason deficient to meet normal requirements by supplementing gas flowing to the patient's lungs from a supply of pressured gas while the degree of supplementation is controlled by the pressure exerted by the patient's inhalation meanwhile minimizing resistance to passage of the patient's exhalations to the atmosphere, which comprises a source of gas whose pressure when emitted is pre-set; a face mask for the patient, a control cabinet having an inlet port; gas-conducting means from the supply of gas to the control cabinet; a flexible tube for conducting gas from the control cabinet to the mask, a flexible and deformable exhalation escape valve in the tube adjacent to the mask operable by exhalation pressure to pass exhalations of the patient to the atmosphere and closing it upon the patient's inhalation, pressure responsive spool-valve means on the control cabinet for controlling the admission of pre-set pressured gas past the spool-valve means to flow through the flexible tube to its connected mask by pressure exerted on the valve means by the patient's inhalation until the patient's lung pressure substantially equals the pre-set pressure of the gas and the termination thereupon of such admission, and conduit means operatively connected to admit pressured gas to one side of said exhalation valve to close same during the inhalation phase of the breathing cycle.

6. Respirator apparatus for enhancing a patient's breathing when such breathing is for some reason deficient to meet normal requirements by supplementing gas flowing to the patient's lungs from a supply of pressured gas while the degree of supplementation is controlled by the pressure exerted by the patient's inhalation meanwhile minimizing resistance to passage of the patient's exhalations to the atmosphere, which comprises a source of gas whose pressure when emitted is pre-set, a face mask for the patient, a control cabinet, gas-conducting means from the supply of gas to the control cabinet, a flexible tube for conducting gas from the control cabinet to the mask, a flexible and deformable exhalation escape valve in the tube adjacent the mask operable by exhalation pressure to pass exhalations of the patient to the atmosphere and closing it upon the patient's inhalation, pressure-responsive spool-valve means on the control cabinet for controlling the admission of pre-set pressured gas past the spool-valve means to flow through the flexible tube to its connected mask by pressure exerted on the valve means by the patient's inhalation until the patient's lung pressure substantially equals the pre-set pressure of the gas and the termination thereupon of such admission, and manually operable means for cycling the alternating change from inhalation to exhalation and back to inhalation in the event the patient is apneic.

7. Respirator apparatus for enhancing a patient's breathing when such breathing is for some reason deficient to meet normal requirements by supplementing gas flowing to the patient's lungs from a supply of pressured gas while the degree of supplementation is controlled by the pressure exerted by the patient's inhalation meanwhile minimizing resistance to passage of the patient's exhalations to the atmosphere, which comprises a source of gas whose pressure when emitted is pre-set, a face mask for the patient, a control cabinet, gas-conducting means from the supply of gas to the control cabinet, a flexible tube for conducting gas from the control cabinet to the mask, a flexible and deformable exhalation escape valve in the tube adjacent to the mask operable by exhalation pressure to pass exhalations of the patient to the atmosphere and closing it upon the patient's inhalation, pressure-responsive spool-valve means on the control cabinet for controlling the admission of pre-set pressured gas past the spool-valve means to flow through the flexible tube to its connected mask by pressure exerted on the valve means by the patient's inhalation until the patient's lung pressure substantially equals the pre-set pressure of the gas and the termination thereupon of such admission, wherein the spool-valve means includes a chamber across which a diaphragm is mounted, a reciprocable spool-valve movable in at least one direction by lateral flexing of the diaphragm, a ported casing around the spool-valve having a pressured gas inlet port and a pressured gas outlet port the latter of which is connectible and disconnectible with the inlet port by the spool-valve, a laterally-movable disc controlling passage of pressured gas from the outlet port to the tube leading to the mask, a pressure-receiving chamber having an opening at one end but permanently closed at its other end by the diaphragm, a disc movable to open and to close said opening, and means for conducting pressured gas from the outlet port in the spool-valve into the pressure-receiving chamber through a venturi.

8. Apparatus of the class described having a source of fluid whose pressure when emitted is pre-set; a pipe through which such fluid is to be delivered; and a fluid flow control cabinet interposed between the source and the pipe comprising a chamber communicating with the pipe and having an inlet port thereinto, a fluid pressure-sensing disc for opening and closing the port, a spring biasing the opening of the disc, spool-valve means having a ported sleeve and a spool reciprocable therewith while linked to the disc to move therewith, means for conducting fluid pressure from the source through a pressure inlet port of the sleeve thereinto, means for passing fluid pressure from the sleeve through an outlet port thereof to the pipe, a spring pressure-sensing diaphragm with which the spool is also linked to move therewith, a spring biasing movement of the diaphragm toward the disc, and means for regulating the tension of the spring exerted on the diaphragm in one direction relative to the tension of the spring exerted on the disc in the other direction, whereby when pressure in the delivery pipe exceeds the pressure exerted by the diaphragm-biasing spring the disc is closed but while pressure in the delivery pipe is less than the pressure exerted by the diaphragm-biasing spring the disc remains open.

9. Apparatus according to claim 8, wherein the spool is carried by a shaft means extending through the disc on which the disc-biasing spring is mounted and which also extends through the cabinet whereby it and its spool can be manually reciprocated.

10. Apparatus according to claim 8, wherein the spool is carried by a shaft means extending through the disc on which the disc-biasing spring is mounted and which extends from the cabinet, a sleeve rotatable on the shaft means also extending from the cabinet, and means on the rotatable sleeve for adjusting the tension of the diaphragm-biasing spring.

11. Apparatus according to claim 8, with the addition in the pipe ahead of its connection with the chamber of a nozzle and a venturi into which the nozzle delivers fluid, an inlet port from the interior of the cabinet leading to the space between the nozzle and the venturi, a fluid outlet in the pipe ahead of the nozzle for releasing fluid from the pipe into the interior of the cabinet, a valve for regulatably controlling the fluid outlet for thus regulating the quantity of fluid emitted from the pipe ahead of the nozzle into the interior of the cabinet that is subsequently sucked from the cabinet back into the pipe through the inlet port leading to the venturi.

12. Apparatus of the class described, having an inflow pipe from a source of fluid whose pressure is pre-settable; a pipe through which such fluid is delivered for use; and a fluid flow control cabinet interposed between said pipes comprising a housing communicating with said pipes for receiving fluid from the inflow pipe and for passing fluid to the delivery pipe, an air-inlet opening into the cabinet which cabinet is otherwise air-tight, a nozzle on the fluid inflow pipe in the housing, a venturi into which fluid is ejected from the nozzle on its way to the delivery pipe from the cabinet, a port providing communication from the interior of the cabinet to the nozzle and the entrance to the venturi through which fluid from the interior of the cabinet is sucked into the venturi and the pressure in the cabinet thus rendered sub-atmospheric which sub-pressure in turn sucks air through the air-inlet to the cabinet to thus admix such air with the fluid passing to and through the venturi.

13. Apparatus according to claim 12, with the addition of an outlet into the cabinet from the inflow pipe at a point ahead of the nozzle, a valve for controlling the latter outlet for regulating the quantity of fluid bled off from the inflow pipe into the cabinet to effect super-atmospheric pressure in the cabinet and thus effectively minimizing the entrance of air through the air inlet to the cabinet.

14. Apparatus of the class described, having an inflow pipe from a source of oxygen whose pressure is pre-settable; a pipe through which such oxygen is delivered for use; and an oxygen flow control cabinet interposed between said pipes comprising a housing communicating with said pipes for receiving oxygen from the inflow pipe and for passing oxygen to the delivery pipe, an air-inlet opening into the cabinet which cabinet is otherwise airtight, a nozzle on the oxygen inflow pipe in the housing, a venturi into which oxygen is ejected from the nozzle on its way to the delivery pipe from the cabinet, a port providing communication from the interior of the cabinet to the nozzle and the entrance to the venturi through which oxygen from the interior of the cabinet is sucked into the venturi to be admixed with the oxygen passing thereto from the nozzle, an outlet into the cabinet from the inflow pipe at a point ahead of the nozzle, and valve means on the latter outlet for regulating the quantity of oxygen bled off from the inflow pipe into the cabinet for controlling the total volume of oxygen passed through the venturi which volume is made up partly of the constant volume ejected through the nozzle supplemented by the additional volume first bled off from the outlet into the cabinet and then sucked from the cabinet to join in the venturi the oxygen ejected from the nozzle thereinto.

15. Apparatus of the class described, having an inflow pipe from a source of fluid whose pressure is pre-settable; a pipe through which such fluid is delivered for fluctuating use; and a fluid flow control cabinet interposed between said pipes comprising a housing communicating with said pipes for receiving fluid from the inflow pipe and for passing fluid to the delivery pipe, a laterally movable pressure sensing disc whose movement opens and closes the delivery pipe leading from the housing, a laterally deformable pressure sensing diaphragm in the housing and exposed on one side to the pressured fluid inflowed to the housing, axially slidable spool-valve means extending between the disc and the diaphragm, a spring-biasing connection between the disc and one end of the spool-valve means, a lost motion connection between the diaphragm and the other end of the spool-valve means, sleeve means extending laterally of the diaphragm and movable with the diaphragm as the latter is deformed, a spring biased axially movable cup in the housing for exposing the other side of the diaphragm through its lateral slide to spring pressure actable in a direction opposite to the fluid pressure on the other face of the diaphragm, and means external of the housing for regulating spring-biasing pressure on the cup for determining that point in the fluctuating use of the pressured fluid below which the disc will move to close the supply thereof to the delivery pipe and above which the disc will move to open that supply.

16. Respirator apparatus for enhancing a patient's breathing when such breathing is for some reason deficient to meet normal requirements by supplementing gas flowing to the patient's lungs from a supply of pressured gas while the degree of supplementation is controlled by the pressure exerted by the patient's inhalation meanwhile minimizing resistance to passage of the patient's exhalations to the atmosphere, which comprises a source of gas whose pressure when emitted is pre-set, a face mask for the patient, a control cabinet, gas-conducting means from the supply of gas to the control cabinet, a flexible tube for conducting gas from the control cabinet to the mask, an exhalation escape valve in the tube adjacent the mask, automatic means for opening the escape valve to pass exhalations of the patient to the atmosphere and closing it upon the patient's inhalation, pressure-responsive spool-valve means on the control cabinet for controlling the admission of pre-set pressured gas past the spool-valve means to flow through the flexible tube to its connected mask by pressure exerted on the valve means by the patient's inhalation until the patient's lung pressure substantially equals the pre-set pressure of the gas and the termination thereupon of such admission, manually operable means for cycling the alternating change from inhalation to exhalation and back to inhalation in the event the patient is apneic, wherein the pressure-responsive spool-valve means includes a chamber across which a diaphragm is mounted, a reciprocable spool-valve movable by the lateral flexing of the diaphragm, a ported casing around the spool-valve having a pressured gas inlet port and a pressured gas outlet port the latter of which is connectible and disconnectible with the inlet port by the spool-valve, a laterally-movable disc controlling passage of pressured gas from the outlet port to the tube leading to the mask, a pressure-receiving chamber openable and closable at one end by the diaphragm, means for conducting pressured gas from the outlet port in the spool-valve into the pressure-receiving chamber through a venturi, rod means for the spool-valve extending both through the diaphragm and through the disc valve, springs provided on each terminal end of the rod means tensioned through the rod against each other, a lateral extension movable with the diaphragm, means biasing the extension and a shaft for varying the tension of the latter biasing means which extends to a point outside the control cabinet.

17. Respirator apparatus for enhancing a patient's breathing when such breathing is for some reason deficient to meet normal requirements by supplementing gas flowing to the patient's lungs from a supply of pressured gas while the degree of supplementation is controlled by the pressure exerted by the patient's inhalation meanwhile minimizing resistance to passage of the patient's exhalations to the atmosphere, which comprises a source of gas whose pressure when emitted is pre-set, a face mask for the patient, a control cabinet, gas-conducting means from the supply of gas to the control cabinet, a flexible tube for conducting gas from the control cabinet to the mask, a flexible and deformable exhalation escape valve in the tube adjacent to the mask operable by exhalation pressure to pass exhalations of the patient to the atmosphere and closing it upon the patient's inhalation, pressure-responsive spool-valve means on the control cabinet for controlling the admission of pre-set pressured gas past the spool-valve means to flow through the flexible tube to its connected mask by pressure exerted on the valve means by the patient's inhalation until the patient's lung pressure substantially equals the pre-set pressure of the gas and the termination thereupon of such admission, wherein the spool-valve means includes a chamber across which a diaphragm is mounted, a reciprocable spool-valve movable in at least one direction by lateral flexing of the diaphragm, means for moving said spool-valve in the other direction, a ported casing around the spool-valve having a pressured gas inlet port and a pressured gas outlet port the latter of which is connectible and disconnectible with the inlet port by the spool-valve, a laterally-movable disc controlling passage of pressured gas from the outlet port to the tube leading to the mask, a pressure-receiving chamber having an opening at one end but permanently closed at its other end by the diaphragm, a disc movable to open and to close said opening, and means for conducting pressured gas from the outlet port in the spool-valve into the pressure-receiving chamber through a venturi.

18. The apparatus according to claim 17, wherein the means for moving the spool-valve in the other direction comprises means depending from the diaphragm.

19. The apparatus according to claim 17, wherein the means for moving the spool-valve in the other direction includes the laterally-movable disc.

References Cited in the file of this patent

UNITED STATES PATENTS

| | | |
|---|---|---|
| 2,693,178 | Gilroy | Nov. 2, 1954 |
| 2,764,151 | Cupp | Sept. 25, 1956 |
| 2,774,346 | Halliburton | Dec. 18, 1956 |

FOREIGN PATENTS

| | | |
|---|---|---|
| 663,202 | Great Britain | Dec. 19, 1951 |